(12) United States Patent
Atkins et al.

(10) Patent No.: US 7,750,804 B2
(45) Date of Patent: Jul. 6, 2010

(54) MULTIPLE SENSOR LIGHTING SYSTEM

(75) Inventors: Barry L. Atkins, Goodlettsville, TN (US); Keith Alan Springs, Bowling Green, KY (US); Emmet Joseph Roche, Bowling Green, KY (US)

(73) Assignee: HeathCo LLC, Elmhurst, IL (US)

( * ) Notice: Subject to any disclaimer, the term of this patent is extended or adjusted under 35 U.S.C. 154(b) by 236 days.

(21) Appl. No.: 11/679,559

(22) Filed: Feb. 27, 2007

(65) Prior Publication Data

US 2010/0033326 A1 Feb. 11, 2010

Related U.S. Application Data

(63) Continuation-in-part of application No. 11/675,918, filed on Feb. 16, 2007.

(51) Int. Cl.
G08B 13/00 (2006.01)
G08B 13/08 (2006.01)

(52) U.S. Cl. .................... 340/541; 340/545.3

(58) Field of Classification Search ............. 250/332, 250/334, 353–360.1, 366.1, 202.1, 559.37, 250/559.32, 559.38, 206.1, 214 D, 215, 214 AL, 250/214 B, 221, 526; 340/539.26, 541, 545.2, 340/545.3, 550, 552, 555, 565, 573.1, 693.6, 340/3.1, 3.9, 825.19, 309.16, 309.3, 309.4, 340/309.8, 309.9; 315/155
See application file for complete search history.

(56) References Cited

U.S. PATENT DOCUMENTS

| | | | |
|---|---|---|---|
| 4,873,469 A * | 10/1989 | Young et al. ............. | 315/155 |
| 5,027,662 A | 7/1991 | Titlow et al. | |
| 5,107,120 A | 4/1992 | Tom | |
| 5,406,083 A | 4/1995 | Sandell et al. | |
| 5,418,368 A | 5/1995 | Sandell et al. | |
| 5,424,718 A | 6/1995 | Muller et al. | |
| 5,434,821 A | 7/1995 | Watanabe et al. | |
| 5,453,622 A | 9/1995 | Sandell et al. | |
| 5,670,943 A | 9/1997 | DiPoala et al. | |
| 5,703,368 A * | 12/1997 | Tomooka et al. ............ | 250/349 |
| 5,839,821 A | 11/1998 | LeZotte | |
| 5,923,250 A | 7/1999 | Pildner et al. | |
| 5,946,209 A | 8/1999 | Eckel et al. | |
| 6,175,309 B1 | 1/2001 | Drake et al. | |
| 6,323,488 B1 | 11/2001 | McCavit et al. | |
| 6,376,840 B1 | 4/2002 | Ko | |
| 6,781,129 B2 | 8/2004 | Leen | |

(Continued)

OTHER PUBLICATIONS

U.S. Appl. No. 11/675,918; Filed: Feb. 16, 2007; Barry L. Atkins; "Multiple Sensor Variable Illumination Level Lighting System." A copy of the application and the last Response containing the updated claim set.

*Primary Examiner*—Jennifer Mehmood
(74) *Attorney, Agent, or Firm*—Fitch, Even, Tabin & Flannery

(57) ABSTRACT

A circuit for operating a plurality of electrical devices such as lamps for outdoor illumination includes a plurality of motion sensor circuits for detecting motion relative thereto and a plurality of outputs conditioned upon motion detection. Additionally, a photocell sensor circuit for detecting a low ambient illumination level has an output command conditioned upon the detection of a predetermined illumination level that is electrically coupled to the control circuit for illumination of lamps at low ambient lighting levels. The present invention enables the activation of lamps by a plurality of motion sensors having differing fields of view.

30 Claims, 3 Drawing Sheets

U.S. PATENT DOCUMENTS

| | | |
|---|---|---|
| 6,943,685 B2 * | 9/2005 | Seo .......................... 340/541 |
| 6,943,687 B2 | 9/2005 | Lee et al. |
| 2003/0179091 A1 | 9/2003 | Lee et al. |
| 2005/0040947 A1 | 2/2005 | Buckley et al. |
| 2005/0116171 A1 * | 6/2005 | Lee et al. .................... 250/342 |
| 2005/0258954 A1 * | 11/2005 | Ruskin ...................... 340/527 |
| 2007/0014105 A1 | 1/2007 | Noguchi et al. |
| 2007/0189000 A1 * | 8/2007 | Papamichael et al. .......... 362/1 |

* cited by examiner

MULTIPLE SENSOR LIGHTING SYSTEM

CROSS-REFERENCE TO RELATED APPLICATIONS

The present application is a continuation-in-part, and claims the benefit of copending U.S. Utility patent application Ser. No. 11/675,918, filed Feb. 16, 2007, and entitled, "Multiple Sensor Variable Illumination Level Lighting System."

BACKGROUND OF THE INVENTION

The present invention relates generally to a security lighting system and more specifically to a lighting system and circuit capable of activating a plurality of lamps or other electrically operated devices responsive to sensed motion in multiple fields of view and even ambient light level as sensed by a plurality of sensors.

DESCRIPTION OF THE RELATED ART

Lighting control systems incorporating photosensitive sensors are currently used in many commercially available illumination systems where it is desirable to activate a light source responsive to sensed ambient light. Control systems that activate lamps or other electrical devices responsive to a sensed level of ambient light often incorporate integral motion sensors to activate a light or some other electrically operated security feature based upon sensed movement proximate a motion sensor. In many of these prior art systems, it is desirable to sense the amount of ambient light as a precondition for light activation based on a motion event, since there is no need to turn on a security light, for example, in broad daylight.

Many prior art illumination systems as discussed above suffer from an array of drawbacks. In most illumination systems there is a necessity for turning on a security light in one location when motion is detected or sensed in another location or direction. For example, in a residential setting an installer may want to design a lighting system to activate a security light located on or near the front or back door of a house when motion is sensed at a point proximate the adjacent walkway or driveway or yard. In some prior art systems, a remote motion sensor is physically wired to interact with a switching system to activate the necessary lamps.

Furthermore, many of these motion sensor systems don't have the ability to sense motion in more than one "zone" or viewing area because of the inherent limitations of viewing fields of many known in the art motion sensors used for detecting motion over either a wide or elongated viewing area. In order to address this problem, many prior art systems utilize Fresnel lenses or the like to improve the field of motion detection for a given sensor mounted in a fixed location.

A number of prior art illumination systems employ a wide angle motion detector that is unable to detect motion in a desired coverage area when the sensor the sensor is unable to be located in a precise location necessary to aim its sensor. For example, in some applications motion detectors are aimed at a long narrow area such as a walkway or sidewalk where they are employed to activate a floodlight or the like. In such applications the single wide angle detector may have to be mounted in a location where it must be able to detect motion at either end of the walkway simply due to the physical layout of the building or structure. This arrangement often proves unworkable depending upon placement and orientation of the fixture.

Additionally, these single wide angle detector devices typically have sensor viewing fields with uniform heights or depths. As such, their viewing fields can not be adjusted to configure the detector for a given application.

SUMMARY OF THE INVENTION

The present invention provides an illumination system including a control circuit employing a plurality of motion sensors capable of controlling the operation of a plurality of electrical devices, typically lamps or the like, responsive to the motion sensed in a plurality of viewing fields. The invention incorporates a motion sensor circuit that may include a plurality of passive infrared sensors (PIR) and associated signal conditioning circuitry to provide at least one output signal representative of a motion event, or a plurality of motion events within the fields of view of the PIR sensors to a control circuit. The PIR sensors may be arranged to detect motion in different fields of view, for example an "outward" field of view and a "downward" field of view.

The control circuit may include a logic circuit, for example an application specific integrated circuit (hereinafter ASIC), that may be suitably programmed with logic instructions to provide a concomitant power output to actuate a lamp or other electrical device responsive to a plurality of sensed conditions.

The invention further may additionally include a photocell sensor and circuit that provides an output to the control circuit representative of a low ambient light level on a photocell, whereby the activation of a lamp output or outputs may be conditioned upon a dusk or night event. An on-timer circuit may also be included to provide a means for a user to activate the lamp output or outputs for a predetermined amount of time responsive to a motion event based upon a plurality of timer variables.

Additionally, the present invention utilizes two separate "look-out and look-down" motion sensors and concomitant circuitry that enables the invention to detect a motion event at a distance outwardly from the placement of a fixture or light including the sensors, as well as enable the detection of motion below or proximate to the fixture location. This feature of the invention makes it particularly suitable for use in a setting where an installer desire to activate a light or lights when motion is detected in distinct areas such as a sidewalk or porch below or near the light and a yard or other area oriented outwardly therefrom.

Both the look-out and look-down sensors and circuits are integrated with the photocell sensor circuit that enables the look-out and look-down sensors to activate a lamp or other device conditioned upon the status of the photocell sensor circuit, as will be described in further detail herein below.

Other objects, features and advantages of the present invention will become apparent upon inspection of the detailed description of the preferred embodiments herein below taken in conjunction with the drawing Figures.

BRIEF DESCRIPTION OF THE DRAWING FIGURES

DETAILED DESCRIPTION OF THE PREFERRED EMBODIMENT(S)

Figure 1:
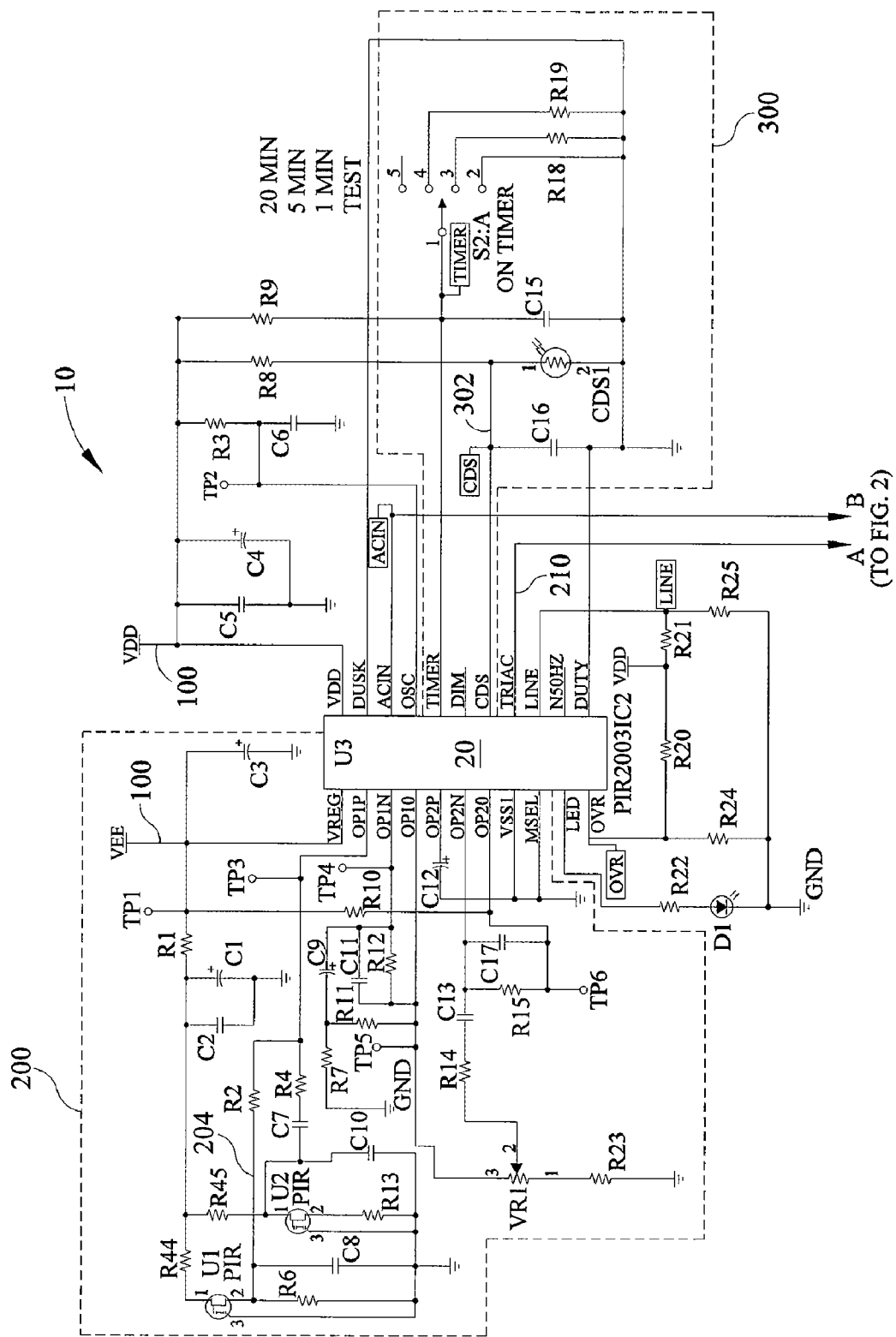
FIG. 1 is a block diagram of an illumination system in accordance with one embodiment of the present invention.
Figure 2:
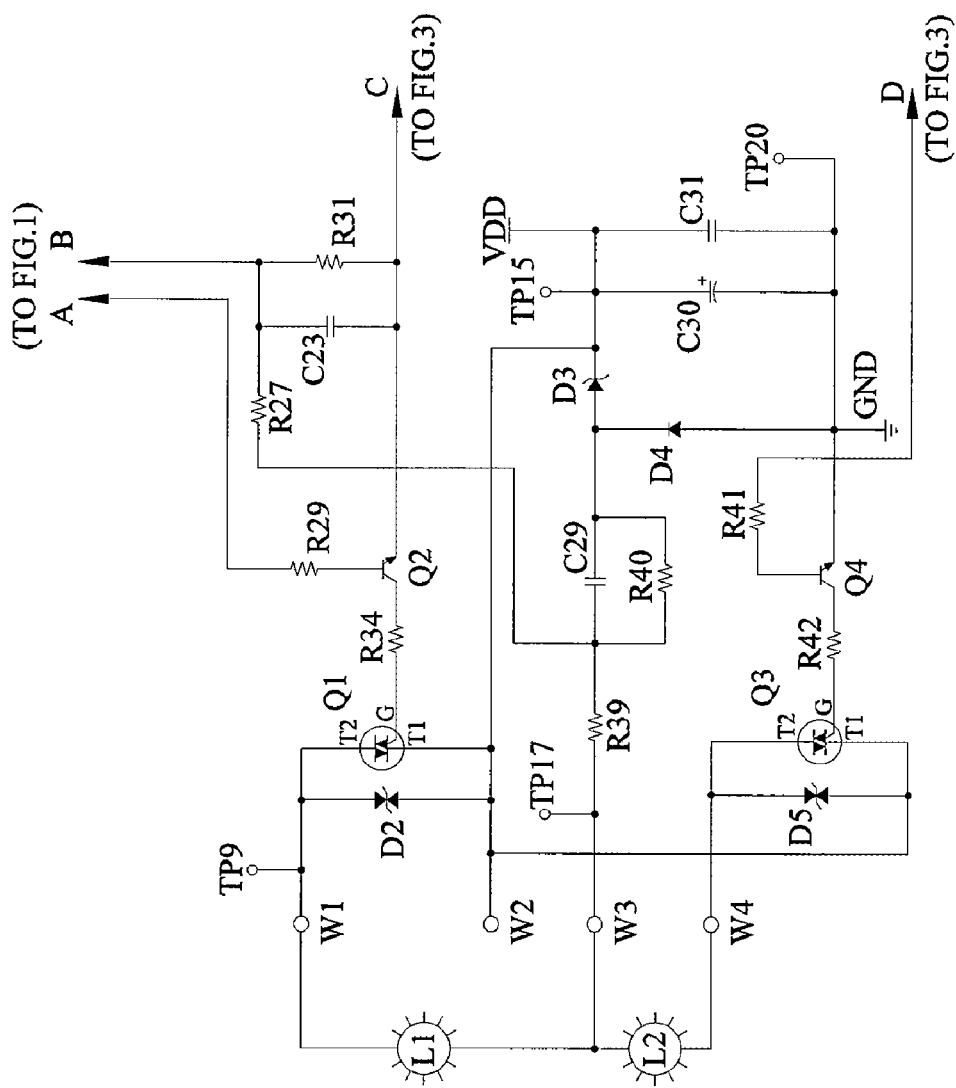
FIG. 2 is an electrical schematic of a circuit for detecting motion and ambient light in accordance with one embodiment of the present invention.
Figure 3:
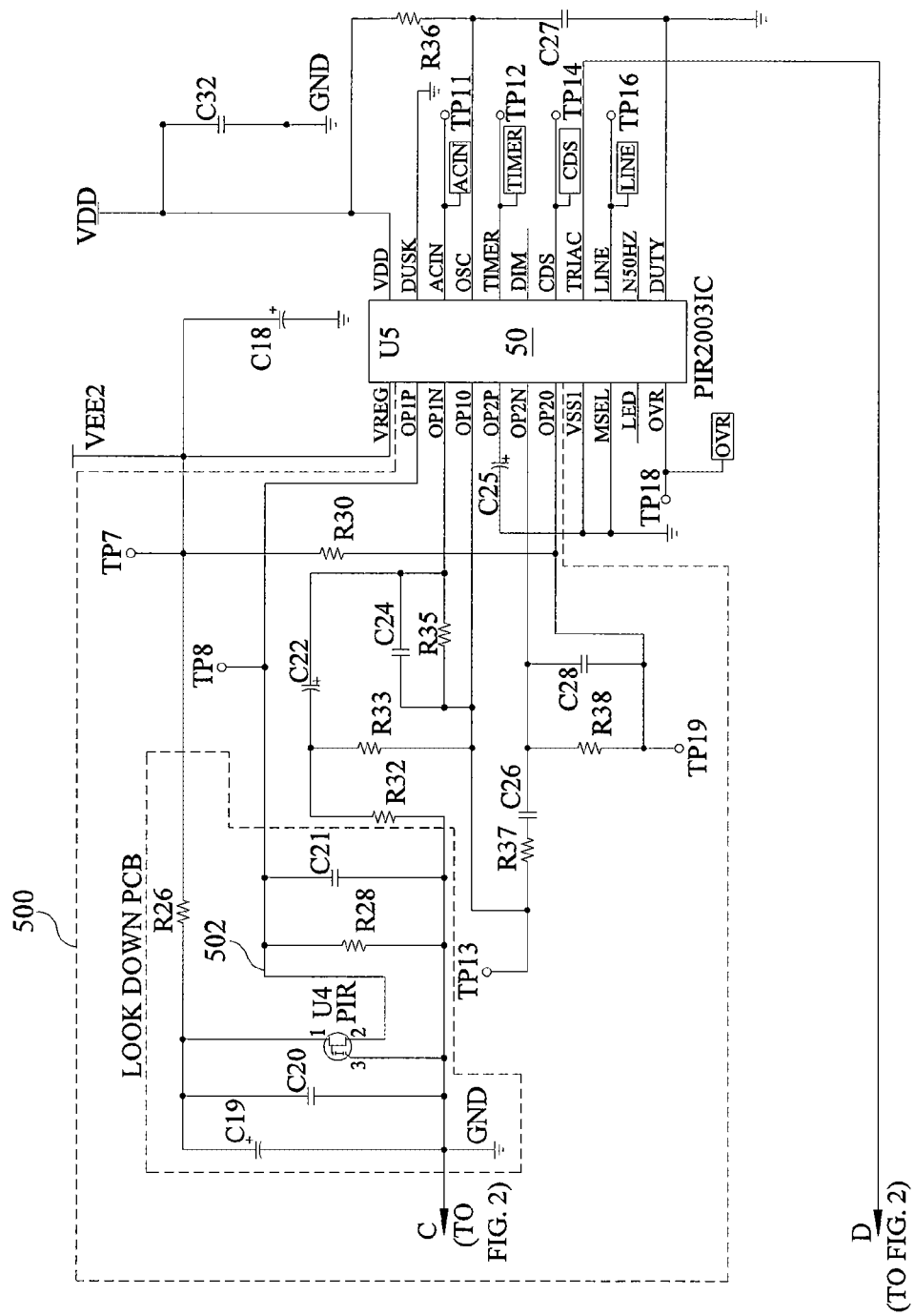
FIG. 3 is an electrical schematic of a circuit in accordance with one embodiment of the present invention.

Referring now to FIGS. 1-3, and in accordance with a preferred constructed embodiment of the present invention, an illumination system 10 capable of controlling the operation of a plurality of electrical devices such as lights or switches includes a first control circuit 20, shown in an exemplary fashion in FIG. 1 as an application specific integrated circuit (ASIC) U3 having a plurality of input and output pins for accepting a plurality of inputs and outputs as discussed further herein below.

The ASIC U3 shown in FIG. 1 is capable of operation with the various embodiments of the invention disclosed herein, although it is recognized that a wide variety of commercially available integrated circuits, microprocessors or programmable logic controllers or alternatively, conventional microelectronic circuits, may serve an equivalent function of control circuit 20 without departing from the spirit or scope of the present invention.

A power supply circuit 100 includes a direct current voltage source VDD, which may be, for example, a conditioned AC voltage source for supplying DC power to illumination system 10. Power supply circuit 100 further comprises voltage source VEE which is a regulated direct current power output supplied by ASIC U3 to provide a constant 4.6 volts of regulated direct current power for the operation of system 10 of the current invention.

The system 10 further comprises a first control circuit 200 which may include a plurality of PIR (passive infrared) sensors shown as U1 and U2 in FIG. 1 that are capable of sensing infrared radiation over a predetermined field of view and producing respective output signals 204 responsive to a threshold detected infrared radiation level. Output signals 204 are thus representative of a motion event within the range of detection of PIR sensors U1 and/or U2 and are electrically coupled to input pins OP1P/OPIN of ASIC U3. Pins OP1P and OP1N are the non-inverting and inverting input pins of an operational amplifier circuit integral to ASIC U3 that provides signal amplification and noise filtration for PIR sensor signals 204. Varying types of motion sensors may be used in place of PIR sensors U1 and U2 in conjunction with sensor circuit 200, for example ultrasonic sensors or other pyroelectric type sensors without departing from the scope of the present invention.

Detection system 10 further comprises a photocell circuit 300 including a photocell CDS1 having an output signal 302 representative of a predetermined level of ambient light impinging on sensor CDS1. Output signal 302 is electrically coupled to the CDS pin of ASIC U3 thus providing a signal indication to first control circuit 20 that the ambient lighting conditions are sufficiently dim to enable the activation of, for example, a lamp or lamps employed as security lighting.

Photocell circuit 300 may also comprise an on-timer switch S2:A having a plurality of switch positions that permit a user to select the amount of time a power output should be actuated conditioned upon the position of S2:A. As shown in FIG. 1, S2:A includes a test position, a 1 minute position, a 5 minute position and a 20 minute position. In the test position, S2:A disconnects a TIMER pin of ASIC U3 (and also ASIC U5 as discussed further herein below) from any signal input, thereby signaling to ASICs U3 and U5 the actuation of the assigned output for an indefinite duration when any motion event is detected by PIR motion sensors U1 or U2. Similarly, the 1 minute, 5 minute, and 20 minute timer positions of S2:A provide signals to ASICs U3 and U5 that indicate that the assigned output of each ASIC should be actuated for one, five or twenty minute, respectively, upon the sensing of a motion event by PIR sensors U1 or U2.

While switch S2:A is depicted in FIG. 1 as a four position switch, it is to be understood that these are exemplary embodiments only, and that switches having a greater number of switch positions and concomitant resistors may be employed to provide a plurality of on timer intervals without departing from the scope of the present invention.

Referring now to FIG. 3 and in accordance with one embodiment of the invention, a second control circuit 50 comprises an ASIC U5 having a plurality of signal inputs and outputs for accepting a plurality of signal inputs and providing a plurality of signal outputs responsive thereto. In one embodiment of the instant invention ASIC U5 is identical in its physical architecture to ASIC U3 of first control circuit 20 and is capable of accepting PIR motion sensor and photocell sensor inputs as well as a plurality of other signal inputs.

Second control circuit 50 is coupled to second motion sensor circuit 500, which comprises a look-down PIR sensor U4 having a signal output 502 electrically coupled to input pin OP1P of ASIC U5. Output 502 provides a high logic level signal to ASIC U5 when a threshold level of infrared radiation is detected thereby, said threshold radiation level being indicative of a motion event within the field of view of PIR sensor U4.

Control circuit 500 includes a TRIAC output on the TRIAC pin of ASIC U5 that may be cycled high and low to fire a triac Q3. As shown in FIGS. 2 and 3, TRIAC pin of ASIC U5 is electrically connected to triac Q3 through transistor Q4 and resistor R41. The TRIAC pin is typically cycled high and low responsive to a motion event sensed by look down PIR sensor U4. Accordingly, an output voltage is provided at terminal W4 through triac Q3. A lamp L2 is connected between terminals W4 and W3 thereby providing illumination when a motion event is detected by look-down PIR sensor U4.

The operation of look-down lamp L2 may be conditioned upon the operation of photocell CDS1, on timer switch S2:A and look-down PIR sensor U4. Where PIR sensor U4 detects a motion event, lamp L2 is operated at high power by cycling TRIAC pin of U5 thereby firing triac Q3. Alternatively, where low ambient light is detected by photocell CDS1, lamp L2 may also be turned on by cycling TRIAC pin of ASIC U5 thereby firing triac Q3. One of ordinary skill will recognize that the output provided between terminals W3 and W4 may operate any number of electrical devices including but not limited to audible alarms, lamps and inputs to other security or control systems without departing from the scope of the present invention.

First control circuit 20 also includes a TRIAC output 210 on its TRIAC pin that is electrically connected to triac Q1 through resistor R29 and transistor Q2. Triac output 210 is cycled high and low to enable the illumination of a lamp L1 connected between terminals W1 and W3, similar to the operation of lamp L2. Accordingly, when photocell CDS1 has sensed a sufficiently low level of ambient light to activate its output 302 triac output 210 is cycled to fire triac Q1 and thus illuminate lamp L1 for a period of time determined by on-timer switch S2:A.

In operation, ASICs U3 and U5 are provided with logical programming instructions to enable operation of lamps L1 and L2 responsive to motion sensor U1/U2, or U4 inputs and responsive to photocell CDS1. Where a motion event is detected by motion sensor U1 or motion sensor U2 and where photocell CDS1 input 302 indicates a sufficiently low level of ambient light, ASIC U3 cycles TRIAC pin high and low thereby illuminating lamp L1 via triac Q1. Similarly, where a motion event is detected by the PIR sensor U4 and when photocell CDS1 input 302 indicates a sufficiently low level of ambient light, the TRIAC pin of ASIC U5 is cycled to provide power to lamp L2 through triac Q3.

Additionally, where timer switch S2:A is set to the test position, the TRIAC pin of ASIC U3 is cycled to provide a high power level output any time motion is detected by first motion sensor circuit 200. Where the timer switch S2:A is set to any other position, the TRIAC output of ASIC U3 is cycled to provide a high power level output when motion is detected by first motion sensor circuit 200 for the amount of time indicated by switch S2:A. TRIAC output of ASIC U3 is electrically coupled to lamp L1 through triac Q1 as best seen in FIGS. 1 and 3.

Similarly, ASIC U5 includes a TRIAC output that is electrically coupled to lamp L2 through triac Q3 as best seen in FIGS. 2 and 3. While the variable power level outputs from ASICs U3 and U5 are depicted as coupled to a plurality of lamps, one of ordinary skill will recognize that a plurality of electrically operated devices may be coupled to the variable power level output without departing from the scope of the present invention.

The various motion sensors of the present invention may employ Fresnel lenses to aid in focusing the specific coverage area or field of view of the sensors as an installation or application requires. In one embodiment of the invention, the look-out sensors U1 and/or U2 have a field of view and an orientation with respect to lamps L1 and L2 that covers a wide detection area, for example 270 degrees, while the look-down sensor U4 is has a field of view oriented to detect motion in a more narrow area proximate the sensor, for example 135 degrees.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

We claim:

1. An apparatus configured to activate at least two electrical power outputs which operate at least two lamps comprising:
a first control circuit having a first motion sensor having a first field of view electrically coupled thereto, the first control circuit having a first power output which is activated in response to sensed motion detected by the first motion sensor;
a first lamp operatively coupled to the first control circuit and first power source, the first lamp operated when the first motion sensor senses motion and the first power source operates the first lamp;
a second control circuit having a second motion sensor having a second field of view different from the first field of view electrically coupled thereto, the second control circuit having a second power output which is activated in response to sensed motion detected by the second motion sensor; and
a second lamp operatively coupled to the second control circuit and second power output, and the second lamp operated when the second motion sensor senses motion and the second power source operates the second lamp.

2. The apparatus of claim 1 further comprising:
a photocell for detecting ambient light impinging thereon, said photocell having an output indicative of a predetermined ambient light level electrically coupled to the first and second control circuits.

3. The apparatus of claim 2 wherein the first power output activation is conditioned upon the photocell detecting a predetermined ambient light level.

4. The apparatus of claim 2 wherein the second power output activation is conditioned upon the photocell detecting a predetermined ambient light level.

5. The apparatus of claim 2 comprising:
an on timer switch having a plurality of switch positions for providing a plurality of input signals to the first and second control circuits indicative of a plurality of predetermined time periods for activation of the first and second power outputs responsive to sensed motion.

6. The apparatus of claim 1 wherein the first control circuit comprises:
an application specific integrated circuit having a first input electrically coupled to the first motion sensor, the integrated circuit activating the first power output responsive to motion sensed by the first motion sensor.

7. The apparatus of claim 1 wherein said second control circuit comprises:
an application specific integrated circuit having a first input electrically coupled to the second motion sensor, the integrated circuit activating the second power output responsive to motion sensed by the first motion sensor.

8. The apparatus of claim 1 wherein the first motion sensor has a field of view in a first orientation with respect to the lamps.

9. The apparatus of claim 1 wherein the second motion sensor has a field of view in a second orientation with respect to the lamps.

10. The apparatus of claim 1 wherein the first power output is electrically coupled to the first lamp whereby motion detected by the first motion sensor activates the first lamp.

11. The apparatus of claim 1 wherein the second power output is electrically coupled to a second lamp whereby motion detected by the second motion sensor activates the second lamp.

12. The apparatus of claim 1 further comprising:
a first triac having an output electrically coupled to the first lamp and a gate electrically coupled to the first power output for illuminating the first lamp.

13. The apparatus of claim 5 further comprising:
a second triac having an output electrically coupled to a second lamp and a gate electrically coupled to the second power output for illuminating the second lamp.

14. The apparatus of claim 1 wherein
the first motion sensor is arranged to detect motion in a first viewing field and the first power output is activated responsive to motion detected in the first viewing field; and
wherein the second motion sensor is arranged to detect motion in a second viewing field and the second power output is activated responsive to motion detected in the second viewing field.

15. The apparatus of claim 2 wherein the first power output is activated responsive to sensed motion as detected by the first motion sensor, regardless of the level of ambient light detected by the photocell.

16. The apparatus of claim 2 wherein the second power output is activated responsive to sensed motion as detected by the second motion sensor, regardless of the level of ambient light detected by the photocell.

17. A system for operating a plurality of electrical devices at a plurality of power levels comprising:
a first motion sensor circuit having at least one look-out motion sensor electrically coupled thereto, the look-out motion sensor having a look-out motion signal output responsive to detected motion in a first field of view;

a second motion sensor circuit having a look-down motion sensor electrically coupled thereto, the look-down motion sensor having a look-down motion signal output responsive to detected motion in a second field of view; and a control circuit having first and second motion sensor inputs operatively coupled to the look-out and look-down sensor outputs, the control circuit further having a plurality of power outputs which operate a plurality of electrical devices, the control circuit operating at least a first electrical lamp device depending upon whether the look out motion sensor detects motion and operating at least a second electrical lamp device depending upon whether or look down motion sensor detects motion, the detection of motion by one motion sensor effecting operation of at least one of the electrical lamp devices independently of whether the first and second motion sensors both detect motion.

18. The system of claim 17 further comprising:

a photocell circuit having a photocell sensor electrically coupled thereto, the photocell sensor having a sensor output responsive to a predetermined level of light impinging on the photocell sensor; and the control circuit having a photocell sensor input coupled to said photocell sensor output.

19. The system of claim 18 further comprising:

an on-timer circuit operatively coupled to the control circuit, the on-timer circuit having an output representative of a plurality of predetermined time periods for activation of the plurality of power outputs responsive to sensed motion.

20. The system of claim 17 wherein said control circuit comprises:

a first integrated circuit having a motion sensor input coupled to the look-out sensor output, and a first power output; and a second integrated circuit having a motion sensor input coupled to the look-down sensor output, and a second power output the first and second integrated circuits configured to operate separate electrical lamp devices depending upon whether the look-out motion sensor or the look down motion sensor detects motion.

21. The system of claim 20 wherein the first power output is activated responsive to the photocell sensing a low level of ambient light or responsive to the look-out sensor detecting motion.

22. The system of claim 20 wherein the second power output is activated responsive to the photocell sensing a low level of ambient light or responsive to the look-out sensor detecting motion.

23. The system of claim 20 wherein the first power output is electrically coupled to a gate of a first triac, whereby the first triac provides an alternating current output.

24. The system of claim 20 wherein the second power output is electrically coupled to a gate of a second triac, whereby the second triac provides an alternating current output.

25. The system of claim 20 wherein said control circuit comprises:

a first integrated circuit having a motion sensor input coupled to the look-out sensor output, and a first power output; and a second integrated circuit having a motion sensor input coupled to the look-down sensor output, and a second power output the first and second integrated circuits configured to operate separate electrical devices depending upon whether the look-out motion sensor or the look down motion sensor detects motion wherein said control circuit comprises:

a first integrated circuit having a motion sensor input coupled to the look-out sensor output, and a first power output; and a second integrated circuit having a motion sensor input coupled to the look-down sensor output, and a second power output the first and second integrated circuits configured to operate separate electrical lamp devices depending upon whether the look-out motion sensor or the look down motion sensor detects motion, and wherein the first and second power outputs are activated responsive to a motion event, and deactivated responsive to the expiration of a time period selected by the on timer circuit.

26. The system of claim 17 wherein the first motion sensor has a 270 degree field of view.

27. The system of claim 17 wherein the second motion sensor has a 135 degree field of view.

28. The system of claim 17 wherein the first and second motion sensors have non-overlapping fields of view.

29. An apparatus which operates at least one electrical device, the apparatus comprising:

a first motion sensor circuit having at least one look-out motion sensor electrically coupled thereto, the look-out motion sensor having a look-out motion signal output responsive to detected motion in a first field of view;

a second motion sensor circuit having a look-down motion sensor electrically coupled thereto, the look-down motion sensor having a look-down motion signal output responsive to detected motion in a second field of view that is different from the first field of view; and a control circuit having first and second motion sensor inputs operatively coupled to the look-out and look-down sensor outputs, the control circuit including:

a first integrated circuit having a first motion sensor input coupled to the look-out sensor output, the first integrated circuit configured to operate at least a first electrical lamp device depending upon whether the look-out motion sensor detects motion, and a second integrated circuit having a second motion sensor input coupled to the look-down sensor output, the second integrated circuit configured to operate at least one second electrical lamp device depending upon whether the sensor or the look-down motion sensor detects motion, wherein, the detection of motion by one motion sensor effects operation of at least one of the electrical lamp devices independently of whether the first and second motion sensors both detect motion.

30. The apparatus as claimed in claim 29 wherein the apparatus further includes a first power output;

a first electrical device connected to the first power output;

a second power output; and a second electrical device connected to the second power output, the first integrated circuit activating the first electrical lamp device in response to the first motion sensor sensing motion, and the second integrated circuit activating the second electrical lamp device in response to the second motion sensor sensing motion.

* * * * *